UNITED STATES PATENT OFFICE.

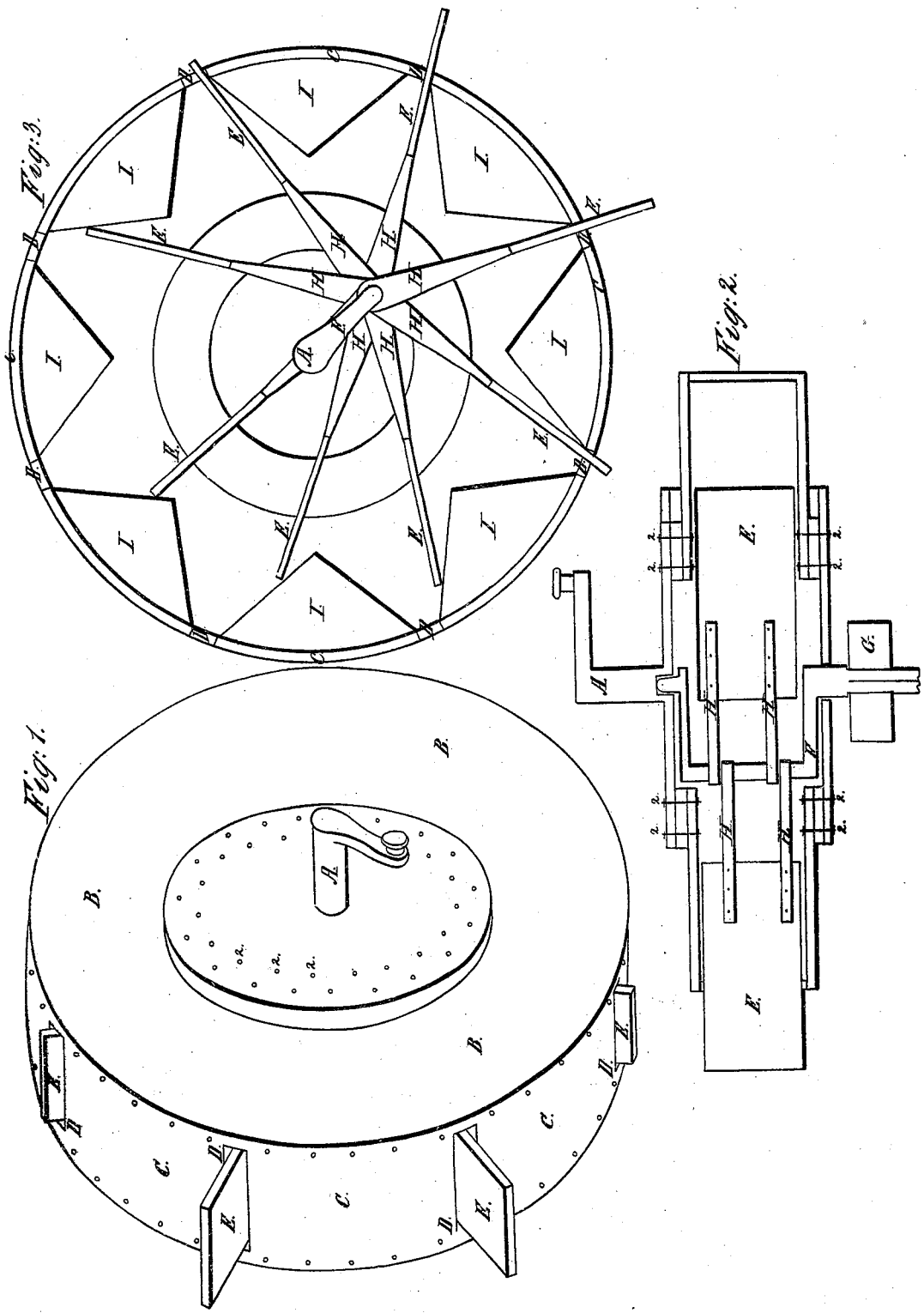

JOHN HOBDAY AND WILLIAM I. COCKE, OF PORTSMOUTH, VIRGINIA.

IMPROVEMENT IN WHEELS FOR PROPELLING STEAMSHIPS, WHICH MAY BE EMPLOYED AS WIND OR WATER WHEELS FOR MILLS.

Specification forming part of Letters Patent No. 2,023, dated March 29, 1841.

*To all whom it may concern:*

Be it known that we, JOHN HOBDAY and WILLIAM I. COCKE, both of the town of Portsmouth, county of Norfolk, and State of Virginia, have invented a new and useful Improvement in the Construction of a Wheel for Propelling Steamships, Steamboats, Water-Mills, and Windmills, which improved wheel can be used either partly in the water, as with other wheels, or entirely under the water and at any depth, and either vertically or horizontally; and we do hereby declare that the following is a full and exact description of the construction and operation of the same, reference being had to the annexed drawings, making a part of this specification, in which—

Figure 1 is a perspective view of the wheel, bringing into view at the letter A the shaft of the wheel B, the drum-head of the wheel, the periphery of the wheel at C, the apertures in the periphery of the wheel at D D D D, the paddles at their different distances of protrusion through the periphery of the wheel at E E E E, the heads of the screws at 1 1 1 1 in the periphery of the wheel, which connects it with the angles on the inside, and the heads of screws at 2 2 2 2, which connects the parts together. Fig. 2 shows a transverse section of the wheel with one of the paddles protruded beyond the periphery of the wheel to its greatest extent, while the other is drawn into its nearest approximation to the center of the wheel. This figure likewise brings into full view the crank F with its axles and shafts, one of which shafts is round and enters the shaft of the wheel at A, and thereby becomes an axle or center for the wheel to turn on, while the other end of the crank is first round and acts as an axle for the drum-head of the wheel to turn on. It then is square and enters a mortise in a fixed plate or bed at G and gives fixedness and stability to the whole wheel. It also brings into view the arms of the paddles at H H H H and their connection with the crank F F F. Fig. 3 brings into view the interior of the wheel with the angular guides I I I I, which give direction to the paddles and lead them to the apertures in the periphery of the wheel. These angles or guides may be made solid, or they may be made air-tight vessels, which would much diminish the weight of the wheel and give buoyancy to the whole structure.

The nature of our invention consists in the combination or union of action of a crank and axle and shaft and drum-head together, and while at the same time that the crank remains stationary it acts as an axle for both the drum-heads of the wheel, and the bow of the crank gives a center of action for the paddles and around which the paddles turn. One end of the shaft of the crank is firmly fixed in a square socket or mortise in a fixed plate or bed, while the other end of the shaft of the crank is round and enters a round socket in the end of the shaft of the wheel or the center of the drum-head of the wheel and becomes an axle for it to turn on, the shaft of the wheel being firmly fixed in the center of the drum-head of the wheel, and, put in motion by a crank, wheel, or otherwise, gives motion to the periphery of the wheel, which thus set in motion becomes the moving power of the paddles and gives them that action that is the great desideratum sought for.

The advantages of this new mode of construction of a wheel to be driven either by steam, wind, or water, when used by individuals will be many and great; but when used by nations they will become incalculable, not only in its construction, which is simple, durable, and strong, but it has many advantages over the ordinary wheel, even when acting on the surface of the water; but when we place it far below and out of the way of danger, either from the shot of the enemy or from the frozen ocean, there in solitude and silence it is performing its laborious task. Thus placed it would allow the ordnance of a national ship to be placed in its most advantageous position, and thus placed, even if the storm or the fire of the enemy should carry away the whole of the upper works of a ship or boat, still this wheel, with its engine far below the surface of the water, would continue to perform its required duty.

What we claim as our invention, and desire to secure by Letters Patent, is—

The introduction of a crank into a wheel, which at the same time that it gives a new center to the paddles or arms it enables them to protrude in time of action and recede when not wanted for action, and at the same time makes the periphery of the wheel the forcing power on the arms or paddles and enables the constructer to make a wheel of the most powerful form.

In testimony that the above is a true and correct description or specification of our said improved wheel we have hereunto set our hands this 27th day of November, A. D. 1840.

JOHN HOBDAY.
WM. I. COCKE.

Attest:
   JNO. HODGES,
   I. BALLENTINE.